(12) United States Patent
Sanada et al.

(10) Patent No.: US 7,005,192 B2
(45) Date of Patent: Feb. 28, 2006

(54) CERAMIC ELECTRONIC COMPONENT AND METHOD OF PRODUCING THE SAME

(75) Inventors: Yukio Sanada, Fukui (JP); Yoshinori Saito, Take-fu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 288 days.

(21) Appl. No.: 10/107,099

(22) Filed: Mar. 26, 2002

(65) Prior Publication Data
US 2003/0007314 A1    Jan. 9, 2003

(30) Foreign Application Priority Data
Mar. 26, 2001  (JP) .............................. 2001-086615
Mar. 26, 2001  (JP) .............................. 2001-086616

(51) Int. Cl.
B32B 31/00   (2006.01)
B32B 9/04    (2006.01)
C25D 5/34    (2006.01)
C25D 5/54    (2006.01)

(52) U.S. Cl. ....................... 428/447; 428/448; 428/450; 205/162; 205/163; 205/183; 205/205; 361/321.1; 361/321.2

(58) Field of Classification Search ................ 205/162, 205/163, 183, 205, 206, 207; 428/446, 447, 428/448
See application file for complete search history.

(56) References Cited

U.S. PATENT DOCUMENTS

2003/0134133 A1 * 7/2003 Kimura et al. .............. 428/469

FOREIGN PATENT DOCUMENTS

GB    2 353 408 A    2/2001
JP    10-214741    * 8/1998

OTHER PUBLICATIONS

Machine translation of JP 10-214741, provided by the JPO website.*
Official Translation of JP 10-214741, provided by the USPTO translation branch.*
UK Search Report dated Sep. 12, 2002.

* cited by examiner

Primary Examiner—Michael J. Feely
(74) Attorney, Agent, or Firm—Dickstein, Shapiro, Morin & Oshinsky, LLP.

(57) ABSTRACT

A ceramic electronic component having a ceramic member into which no plating intrudes, and a method of producing the ceramic electronic component by which the ceramic electronic component can be easily produced are provided. The ceramic electronic component contains a ceramic member, and terminal electrodes formed on both of end-faces of the ceramic member. Each terminal electrode comprises an external electrode, and a plating coat formed thereon. To produce the ceramic electronic component, the ceramic member having the external electrodes are dipped into a water-repelling agent, dried, and plated. The water-repelling agent contains a functional group which is readily adsorbed to the external electrodes and a hydrophobic functional group.

20 Claims, 1 Drawing Sheet

CERAMIC ELECTRONIC COMPONENT AND METHOD OF PRODUCING THE SAME

BACKGROUND OF THE INVENTION

1. Field of the Invention

The present invention relates to a ceramic electronic component and a method of producing the same and, more particularly, to a ceramic electronic component having terminal electrodes formed on end faces of a ceramic member and a method of producing the same.

2. Description of the Related Art

Ceramic electronic components have a structure in which terminal electrodes are formed on a ceramic member comprising a conductor and a ceramic insulator, the terminal electrodes being connected to the conductor, respectively. Each terminal electrode comprises an external electrode formed by baking on an end-face of the ceramic member and a plating coat formed on the external electrode. As the plating coat, an Ni plating coat which provides a solder-proof property required for soldering is formed. Moreover, to enhance the soldering property, a plating coat made of Sn, Sn/Pb, or the like is formed. These plating coats are formed by so-called wet plating, that is, by electroplating the ceramic member in a plating solution.

The external electrodes, formed by baking, have fine voids. Furthermore, in the case in which internal electrodes are formed in the ceramic member, fine voids are present in the interface between the internal electrodes and the ceramic insulator. Therefore, when the ceramic member having the baked external electrodes is dipped into a plating solution, the plating solution intrudes into the voids of the ceramic member and the external electrodes, and remain there.

The plating solution generally contains different kinds of metal salts such as salts of Ni, Sn, Sn/Pb, and the like. These salts, when they remain in the ceramic member, behave as heterogeneous dielectrics. As a result, these salts in the presence of water migrate as ions, and cause the insulation resistance to decrease and so forth.

To prevent the plating solution from intruding as described above, a thermosetting resin such as phenols or the like is impregnated into the ceramic member, and is cured. Thereafter, the excess resin on the surface is eliminated therefrom by polishing or cleaned off by means of a solvent or the like. The voids of the ceramic member and the external electrodes are sealed with the resin, and plating coats are formed on the surfaces of the external electrodes by wet plating, as described above.

However, in the above-described method, it is needed to heat-set the resin and remove the excess heat-set resin on the surface of the ceramic member by polishing or cleaning. This is problematic in that the production process becomes complicated, is unsuitable for mass production, and becomes expensive.

Moreover, if the synthetic resin remains in the finished ceramic electronic component, the resin present in the voids may be dissolved or modified when the electronic part is mounted onto a printed circuit or is used in the atmosphere of high temperature and high humidity after it is mounted. Thus, the reliability of the electronic part may be deteriorated.

SUMMARY OF THE INVENTION

Accordingly, it is a main object of the present invention to provide a ceramic electronic component having a ceramic member into which no plating intrudes, and a method of producing the ceramic electronic component by which the ceramic electronic component can be easily produced are provided.

According to the present invention, there is provided a method of producing a ceramic electronic component having a ceramic member, external electrodes formed on end-faces of the ceramic member, and plating coats formed on the external electrodes, comprising the steps of forming coats for preventing intrusion of a plating solution by performing water-repelling treatment on the external electrodes formed on the ceramic member by a water-repelling agent, and plating the external electrodes, the water-repelling agent including a functional group for enhancing the adsorptivity of the water-repelling agent for the external electrodes, and a hydrophobic group.

Preferably, the functional group for enhancing the adsorptivity is at least one functional group selected from a hydroxyl group, an amino group, and a mercapto group, and the hydrophobic functional group is at least one functional group selected from an alkyl group, a vinyl group, a phenyl group, and a perfluoro group.

Preferably, the water-repelling agent is represented by a formula of $Ra-(CH_2)-Si-(O-Rb)_3$ in which Ra represents the hydrophobic functional group, and at least one of functional groups corresponding to Rb is substituted by a hydroxyl group obtained by the hydrolysis of the functional group corresponding to Rb.

In the above-described method of producing a ceramic electronic component, preferably, the water-repelling agent including hydroxyl substituents which is in a range of about 2% to 80% with respect to the functional groups prior to the hydrolysis is used in water-repelling treatment of the ceramic member.

Also, a ceramic member having a porous surface may be used as the ceramic member.

The method of producing a ceramic electronic component may further comprise the step of heating the ceramic member with the coats for preventing intrusion of the plating solution to produce covalent bond of the external electrodes and the water-repelling agent via condensation-polymerization of the water-repelling agent, after forming the coats for preventing intrusion of the plating solution.

Moreover, a laminated ceramic member including a ceramic and an internal electrode may be used as the ceramic member.

Furthermore, the external electrodes may be formed by coating a paste for the electrodes on the ceramic, and baking.

Also, according to the present invention, there is provided a ceramic electronic component which is produced by the above-described methods of producing a ceramic electronic component.

According to the production method of the present invention, the water-repelling agent is adsorbed to the external electrodes due to the functional group for enhancing the adsorptivity thereof and contained in the water-repelling agent. The plating solution is prevented from intruding into the ceramic member due to the hydrophobic group contained in the water-repelling agent.

In particular, a hydroxyl group, an amino group, and a mercapto group contained in the water-repelling agent act as functional groups for adsorption, and thereby, the water-repelling agent is adsorbed to the external electrodes formed on the end faces of the ceramic member. Since an alkyl group, a vinyl group, a phenyl group, a perfluoro group, or other suitable groups are contained as hydrophobic functional groups in the water-repelling agent adsorbed to the external electrodes, the plating solution is prevented from intruding into the ceramic member.

Moreover, when the water-repelling agent is represented by the formula of Ra—$(CH_2)$—Si—$(O-Rb)_3$ in which a functional group corresponding to Rb is substituted by a hydroxyl group which is adsorptive to the electrodes, the adsorptivity of the water-repelling agent to the external electrodes can be enhanced. The functional group prior to hydrolysis can be absorptive or hydrophobic.

In this case, excellent water-repelling effects can be obtained, when the water-repelling agent including the hydroxyl substituents of about 2 to 80% based on the functional groups prior to the hydrolysis is used. If the content of the hydroxyl substituents is less than about 2% of the groups prior to the hydrolysis, sufficient water-repelling effects can not be obtained. If the content exceeds about 80%, the adsorption amount of the water-repelling agent is excessive, which deteriorates the plating-bonding property.

After the water-repelling agent is adsorbed to the external electrode, a covalent bond of the water-repelling agent and the external electrodes is produced by heating and condensation-polymerization, and a coating for preventing intrusion of a plating solution having an excellent abrasion resistance can be formed.

Regarding the ceramic electronic component using the above-described method of forming electrodes, the plating solution can be prevented from penetrating into the ceramic member in the process of plating on the external electrodes. Thus, the deterioration of the characteristics of the ceramic electronic component due to the plating solution can be avoided.

As the ceramic member, a ceramic member including a ceramic and an internal electrode, or a porous ceramic member may be used. Also, the intrusion of the plating solution can be prevented by making the water-repelling agent be adsorbed to such a ceramic member.

When the ceramic member includes the external electrodes formed by coating a paste for electrodes, and baking, the intrusion of the plating solution can be also avoided.

According to the present invention, the water-repelling agent is sufficiently adsorbed to the external electrodes to obtain water-repelling effects. Thus, the intrusion of the plating solution into the ceramic member can be prevented. Moreover, the ceramic electronic component can be simply produced by dipping the ceramic member having the external electrodes formed thereon into the water-repelling agent, and drying. Furthermore, by heat-condensation-polymerizing the water-repelling agent after it is dried, the abrasion resistance of the coats made from the water-repelling agent can be enhanced, and peeling-off of the coats in the production process can be suppressed. Thus, in the case of mass production of the ceramic electronic component, deterioration of the characteristics of the ceramic electronic component, which may be caused by the intrusion of the plating solution, can be prevented.

DESCRIPTION OF THE PREFERRED EMBODIMENTS

These and other objects, features, and advantages of the present invention will become more apparent in the following detailed description of the embodiments of the present invention made with reference to the drawings.

Figure 1:
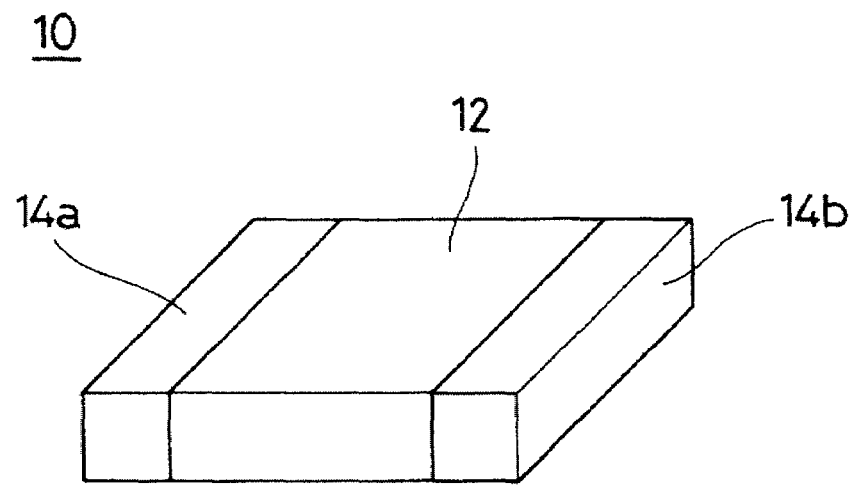
FIG. 1 is a perspective view showing an example of a ceramic electronic component to which the production method of the present invention is applied.
Figure 2:
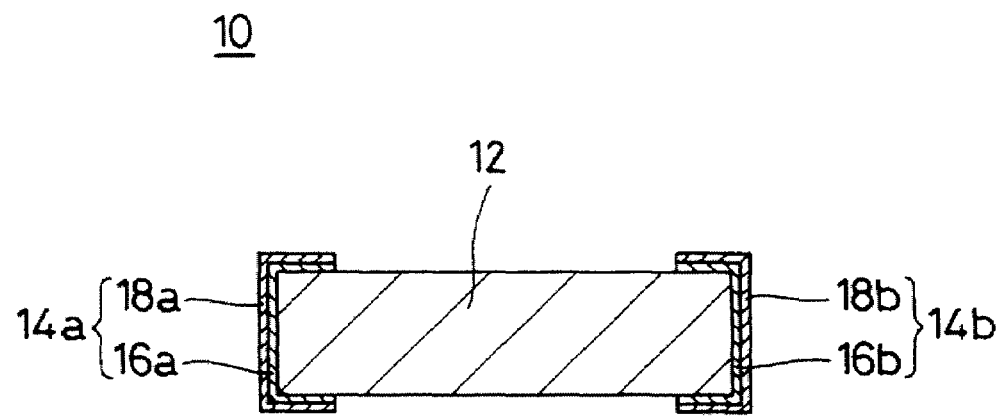
FIG. 2 is a cross-sectional view of the ceramic electronic component of FIG. 1.

FIG. 1 is a perspective view of an embodiment of a ceramic electronic component to which the production method of the present invention is applied. FIG. 2 is a cross-sectional view of the ceramic electronic component of FIG. 1. A ceramic electronic component 10 includes a ceramic member 12. For example, as the ceramic member 12, for example, a ceramic member for use in a laminated ceramic capacitor is used. The ceramic member 12 for use in a laminated ceramic capacitor is produced by printing an electrode material onto a ceramic green sheet, laminating and press-bonding a plurality of the ceramic green sheets, and then firing.

The ceramic member 12 formed as described above has a structure in which the internal electrodes (not shown) formed by the firing the electrode materials are alternately exposed onto both of the end faces. Terminal electrodes 14a and 14b are formed on both of the end faces of the ceramic member 12 on which the internal electrodes are exposed. The terminal electrodes 14a and 14b comprise external electrodes 16a and 16b and plating coats 18a and 18b formed on the external electrodes 16a and 16b, respectively. The plating coats 18a and 18b are not limited onto a single layer structure, respectively. The plating coats 18a and 18b may be formed so as to have a multi-layer structure. For example, it is suggested that an Ni plating layer having a solder-proof property is formed on each of the external electrodes 16a and 16b and, moreover, an Sn plating layer or an Sn/Pb plating layer having a superior solder-bonding property is be formed. As the ceramic member 2, other ceramic members for use in chip inductors, chip resistors, and so forth may be employed.

The external electrodes 16a and 16b are formed by applying a paste for forming electrodes to both of the end faces of the ceramic member 12, and baking. Since the paste for forming electrodes contains glass frits the external electrodes 16a and 16b, formed by baking, have a porous structure. Moreover, the plating coats 18a and 18b are formed on the external electrodes 16a and 16b by wet plating. In this case, a water-repelling treatment is carried out prior to the plating process so that the plating solution is prevented from intruding into the ceramic member 12 through the voids of the external electrodes 16a and 16b, respectively.

According to a first embodiment, the water-repelling agent includes at least one functional group selected from a hydroxyl group, an amino group, and a mercapto group which is readily adsorbed onto the external electrodes 16a and 16b. Moreover, the water-repelling agent includes at least one functional group selected from an alkyl group, a vinyl group, a phenyl group, and a perfluoro group, which are hydrophobic functional groups to prevent the plating solution from intruding the ceramic member 12.

The ceramic member 12 having the external electrodes 16a and 16b formed thereon is dipped into the above-described water-repelling agent, so that the water-repelling agent is made to adhere to the external electrodes 16a and 16b. Then, the ceramic member 12 is air-dried. Thus, coats for preventing the plating solution from intruding into the ceramic member 12 are formed. In this case, the adsorptivity of the water-repelling agent to the electrodes 16a and 16b can be enhanced, since the agent contains the functional group having a high adsorptivity for the electrodes.

Next, the plating coats 18a and 18b are formed by plating on the external electrodes 16a and 16b. In this plating process, the plating solution is prevented from intruding into the ceramic member 12 through the voids of the external electrodes 16a and 16b, since the water-repelling agent adheres to the external electrodes 16a and 16b, and the hydrophobic functional group acts to prevent penetration. Accordingly, the characteristics of the ceramic member 12 do not deteriorate due to the intrusion of the plating solution. Thus, the ceramic electronic component 10 having less variation in its characteristics can be obtained.

After the external electrodes 16a and 16b are dipped into the water-repelling agent, the water-repelling agent may be condensation-polymerized by heating, and the water-repelling agent may be covalently bonded to the external electrodes 16a and 16b. This treatment causes the water-repelling agent and the external electrodes 16a and 16b to strongly bond to each other, and enhances the abrasion resistance of the water-repelling agent. Thus, the excellent sealing property of the external electrodes 16a and 16b can be achieved.

Hereinafter, the water-repelling agent according to a second embodiment of the present invention will be described. The water-repelling agent for use in the water-repellent treatment can be expressed by a formula of $Ra-(CH_2)-Si-(O-Rb)_3$. At least one of functional groups corresponding to Rb in the above-described formula is hydrolyzed to be substituted by a hydroxyl group. The hydroxyl group acts as a functional group which is readily adsorbed to the external electrodes 16a and 16b. Ra represents a hydrophobic functional group to prevent the plating solution from intruding into the ceramic member 12, and is at least one functional group selected from an alkyl group, a vinyl group, a phenyl group, and a perfluoro group. In this case, excellent water-repelling effects can be obtained by using such a water-repelling agent as contains the hydroxyl substituents in an amount of 2% to 80% based on the groups prior to the hydrolysis. When the content of the hydroxyl substituents is less than 2% of the groups prior to the hydrolysis, sufficient water-repelling effects can not be obtained. When the content exceeds 80%, the adsorption amount of the water-repelling agent is excessive, which deteriorates the plating-adhesion property. The content of the hydroxyl groups can be controlled by adjusting the time-period in which the hydrolysis is carried out.

The ceramic member 12 having the external electrodes 16a and 16b is dipped into the described-above water-repelling agent, so that the water-repelling agent adheres to the external electrodes 16a and 16b, and then is air-dried, whereby coats for preventing intrusion of the plating solution are formed. In this case, since the water-repelling agent contains a hydroxyl group which is highly adsorptive for the electrodes, the adsorptivity of the water-repelling agent to the external electrodes 16a and 16b can be enhanced.

Subsequently, plating is carried out, so that the plating coats 18a and 18b are formed on the external electrodes 16a and 16b, respectively. In this process, the plating solution is prevented from intruding into the ceramic member 12 through the voids present in the external electrodes 16a and 16b, since the water-repelling agent adheres to the external electrodes 16a and 16b, and the hydrophobic functional group acts. Thus, the characteristics of the ceramic member 12 suffers no changes by intrusion of the plating solution. The ceramic electronic component 10 of which the characteristics are less dispersed can be obtained.

Moreover, after the external electrodes 16a and 16b are dipped into the water-repelling agent, the water-repelling agent may be heat-condensation-polymerized, so that the water-repelling agent and the external electrodes 16a and 16b covalently bond to each other. This treatment can cause the water-repelling agent and the external electrodes to strongly bond to each other and increase the abrasion resistance of the water-repelling agent. Thus, the sealing property of the external electrodes 16a and 16b can be enhanced.

As described above, a part of the water-repelling agent is converted to have OH groups. The OH groups act as adsorptive groups, so that the water-repelling agent can be adsorbed to metal. In this case, the whole of the water-repelling agent is not OH-converted. Thus, a part of the water-repelling agent having a low adsorptivity to metal remains. The part of the water-repelling agent having the OH groups is strongly adsorbed to the electrodes. The part of the water-repelling agent which is not OH-converted remains weakly adsorbed to the electrodes. Thus, it is speculated that the coats made from the water-repelling agent are formed on the external electrodes of the ceramic member in a network shape, and the water-repelling action can be maintained while the plating coat adhesion property is ensured, due to the network structures of the coats.

EXAMPLE 1

A ceramic member for use in a laminated ceramic capacitor, having Cu base electrodes as external electrodes formed thereon was prepared. A water-repelling agent was prepared for water-repelling-treatment to be carried out after the base electrodes are baked. As the water-repelling agent, 30 g/L of $Ra-(CH_2)-Si-(O-Rb)_3$ added to methyl ethyl ketone as an organic solvent was used. In this formula, Ra represents a perfluoro group, and Rb represents an amino group. The ceramic member having the base electrodes formed thereon was dipped in the water-repelling agent for 2 minutes. The liquid was removed, and the ceramic member was air-dried. Thereafter, Ni plating and Sn plating were sequentially carried out, whereby a laminated ceramic capacitor was formed.

Regarding the obtained laminated ceramic capacitor, the state in which the plating coats were formed inside of the external electrodes, viewed in the cross-sectional structure, the solder-bonding property, and the ratio of rejected products deficient in insulation resistance (damp-proof loading test) were evaluated. In the damp-proof loading test, 4 WV was applied to a sample placed in a thermostat at a temperature of 85° C. and a humidity of 85%, and 1000 hours later, the insulation resistance of the sample was determined. In this case, 1 WV represents the rated voltage of the laminated ceramic capacitor. Thus, 4 WV represents four times of the rated voltage. As comparative examples, a laminated ceramic capacitor in which the plating coats were formed without performing water-repelling treatment, and a laminated ceramic capacitor in which the plating coats were formed after a resin was impregnated into the external electrodes were evaluated as well. Table 1 shows the results. Regarding the fractions shown in Table 1, the denominators represent the numbers of evaluated samples, and the numerators represent the numbers of laminated ceramic capacitor samples rejected with respect to the test items, respectively.

TABLE 1

|  | present invention | not water-repelling-treated | impregnated with resin |
|---|---|---|---|
| intrusion of plating solution into electrodes | 0/100 | 12/100 | 0/100 |
| solder-boding property | 0/100 | 0/100 | 1/100 |
| damp-proof loading test(number of samples having deteriorated insulation resistance) | 0/200 | 5/200 | 1/200 |

As seen in Table 1, for the samples produced by employing the method of forming the electrodes according to the present invention, no intrusion of the plating solution into the electrodes was observed. The solder-bonding property was superior. The damp-proof loading test showed no deterioration of the insulation resistance. On the other hand, regarding the samples not water-repelling-treated, intrusion of the plating into the electrodes was observed for twelve of one hundred samples. Moreover, the damp-proof loading test showed deterioration of the insulation resistance for five of two hundred samples. Moreover, regarding the samples impregnated with the resin, the solder-bonding property was deficient for one of one hundred samples. Probably, the reason lies in that the resin was not sufficiently removed from the surfaces of the external electrodes, and the formation of the plating coats was unsatisfactory.

As described above, by carrying out the water-repelling treatment according to the present invention, the water-repelling agent is adsorbed to the external electrodes, due to an amino group as an absorptive group, so that sealing effects on the external electrodes can be obtained.

EXAMPLE 2

Similarly to Example 1, a ceramic member for use in a laminated ceramic capacitor, having base electrodes formed thereon was dipped into the water-repelling agent for two minutes, the liquid was removed, and the ceramic member was air-dried. Thereafter, the ceramic member was placed into an oven, and heat-treated at a temperature of 100 to 120° C. for 30 minutes. As a comparative example, a ceramic member having the water-repelling agent adsorbed thereto without heat treatment was prepared, similarly to Example 1. These ceramic members were barrel-treated in a 2 L plastic pot at 60 rpm for 30 minutes, assuming that the water-repelling agent would be released, caused by handling in the mass production process. Moreover, Ni plating and Sn plating were sequentially carried out on the base electrodes to form the laminated ceramic capacitors. Regarding these laminated ceramic capacitors, tests of intrusion of the plating into the electrodes and the solder-boding property, and the damp-proof loading test were carried out similarly to Example 1. Table 2 shows the results.

TABLE 2

|  | air-dried only | heat-treated |
|---|---|---|
| intrusion of plating into electrodes | 2/100 | 0/100 |
| solder-bonding property | 0/100 | 0/100 |
| damp-proof loading test (number of samples having deteriorated insulation resistance) | 2/200 | 0/200 |

As seen in Table 2, regarding the air-drying only, intrusion of the plating in the electrodes was observed for two of two hundred samples. The deterioration in the insulation resistance was observed in the damp-proof load test for two of two hundred samples. Probably, the reason lies in that the coats made from the water-repelling agent were released by the barrel-treatment. On the other hand, regarding the heat-treated samples, the water-repelling agent was condensation-polymerized and covalently bonded to the base electrodes. Thus, the coats were not peeled off by the barrel-treatment, and no deterioration of the insulation resistance was shown by the damp-proof loading test.

EXAMPLE 3

As the ceramic member, one for use in a chip inductor, made of a porous ferrite material, was prepared. The external electrodes of the ceramic member were water-repelling-treated similarly to Example 1. Ni plating and Sn plating were sequentially carried out, whereby terminal electrodes were formed on both of end faces of the ceramic member. As comparative examples, a ceramic member without water-repelling treatment and a ceramic member treated with a water-repelling agent having a carboxyl group as an adsorptive group, and a ceramic member impregnated with a resin were prepared. Tests of intrusion of the plating into the electrodes and the solder-bonding property, and damp-proof load test were carried out, similarly to Example 1. Table 3 shows the results.

TABLE 3

|  | present invention | not water-repelling-treated | treated with water-repelling agent containing carboxyl group | impregnated with a resin |
|---|---|---|---|---|
| intrusion of plating into the electrodes | 0/100 | 1/100 | 1/100 | 0/100 |
| solder-bonding property | 0/100 | 0/100 | 0/100 | 3/100 |
| damp-proof loading test (number of samples having deteriorated insulation resistance) | 0/200 | 8/200 | 2/200 | 6/200 |

As is apparent from Table 3, regarding the samples water-repelling-treated according to the present invention, no intrusion of the plating into the electrodes was observed, the solder-boding property was superior, and no deterioration of the insulation resistance was shown by the damp-proof load test. On the other hand, in the comparative examples, some samples showed deterioration of the insulation resistance in the damp-proof loading test. Probably, the reason for the deterioration lies in that no water-repelling property was obtained for the samples which were not water-repelling-treated, and the adsorptivity of the water-repelling agent to the external electrodes was low for the samples treated with the water-repelling agent containing a carboxyl group. Moreover, for the samples impregnated with the resin, the voids of the ferrite are smaller than those of the external electrodes. Probably, the reason for the deterioration lies in that the impregnation with the conventional resin was insufficient. However, when the water-repelling agent is employed according to the method of forming the electrodes of the present invention, the water-repelling agent is ready to be adsorbed to the external electrodes, and sufficient water-repelling effects can be obtained.

EXAMPLE 4

A ceramic member for use in a laminated ceramic capacitor, having Cu base electrodes as external electrodes was prepared. A water-repelling agent was prepared for water-repelling-treatment to be carried after baking of the base electrodes. As the water-repelling agent, a water-repelling agent having a formula of Ra—$(CH_2)$—Si—$(OCH_3)_3$ was prepared. The water-repelling agent of 30 g/L was added to isopropyl alcohol containing water, so that the hydrolysis of the $CH_3$ groups was carried out. Isopropyl alcohol is a water-soluble solvent and is required for the hydrolysis. Ra is a perfluoro group which acts as a hydrophobic functional group.

After the $CH_3$ groups were hydrolyzed, the content of produced —OH groups was determined based on the chemical shift obtained by means of an X-ray photoelectron spectrometer. The OH contents of the prepared water-repelling agents were set at 2%, 10%, 50%, 80%, and 90% based on the water-repelling agent before the hydrolysis. The ceramic members each having the base electrodes were dipped in the water-repelling agents for 2 minutes. Then, the liquids were removed, and the ceramic members were air-dried. Ni plating and Sn plating were sequentially carried out to form laminated ceramic capacitors.

For the obtained laminated ceramic capacitors, the state in which the plating coats were formed inside of the external electrodes, viewed in the cross-sectional structure of the external electrodes, the continuity of the Ni plating, the solder-bonding property, and the number of samples deficient in the insulation resistance (damp-proof loading test) were evaluated. In the damp-proof loading test, 4 WV was applied to a sample placed in a thermostat at a temperature of 85° C. and a humidity of 85%, and 1000 hours later, the insulation resistance of the sample was determined. In this case, 1 WV represents the rated voltage of the laminated ceramic capacitor. That is, 4 WV represents 4 times of the rated voltage. As comparative examples, a laminated ceramic capacitor having plating coats formed thereon, not water-repelling-treated, a laminated ceramic capacitor treated with Ra—$(CH_2)$—Si—$(OCH_3)_3$ in which the $CH_3$ groups were not hydrolyzed, and a laminated ceramic capacitor having plating coats formed after the external electrodes were impregnated with a resin were evaluated in a similar manner as described above. Table 4 shows the results. Regarding the fractions shown in Table 4, the denominators represent the numbers of evaluated samples, and the numerators represent the numbers of laminated ceramic capacitor samples rejected with respect to the test items, respectively.

TABLE 4

| | | intrusion of plating into electrodes number of samples n = 100 | continuity of Ni plating number of samples n = 100 | solder-bonding property number of samples n = 200 | damp-proof loading test number of samples n = 200 |
|---|---|---|---|---|---|
| content of OH group | 2% | 0/100 | 0/100 | 0/200 | 0/200 |
| | 10% | 0/100 | 0/100 | 0/200 | 0/200 |
| | 50% | 0/100 | 0/100 | 0/200 | 0/200 |
| | 80% | 0/100 | 0/100 | 0/200 | 0/200 |
| | 90% | 0/100 | 7/100 | 10/200 | 2/200 |
| not water-repelling-treated | | 12/100 | 0/100 | 0/200 | 7/200 |
| not hydrolyzed | | 13/100 | 0/100 | 0/200 | 5/200 |
| impregnated with resin | | 0/100 | 2/100 | 4/200 | 1/200 |

As seen in Table 4, regarding the samples produced by employing the method of forming the electrodes according to the present invention, no intrusion of the plating into the electrodes was observed, the continuity of the Ni plating, and the solder-boding property were superior, and no deterioration of the insulation resistance was shown by the damp-proof load test. On the other hand, regarding some of the samples without water-repelling-treatment, and the samples treated with the water-repelling agent which is not hydrolyzed, the plating was intruded in the electrodes, and the insulation resistance deteriorated. Moreover, regarding some of the samples impregnated with the resin, and the samples treated with the water-repelling agent of which the content of the OH groups was set at 90%, the continuity of the Ni plating and the solder-bonding property were deficient. Probably, the reason for the deficiencies of these samples lies in that the resin was not sufficiently removed from the surfaces of the electrodes, and the adsorption amount of the water-repelling agent was excessive, so that the formation of the Ni plating coat was unsatisfactory.

As described above, by water-repelling treating according to the present invention, the water-repelling agent is adsorbed to the external electrodes, due to the hydroxyl groups which act as adsorptive groups, so that sealing effects on the external electrodes can be obtained. However, if the hydrolysis of the water-repelling agent excessively proceed so that the content of the OH groups exceeds about 80%, the adsorption amount of the water-repelling agent is too much, the water-repelling effects become excessive, and the plating-bonding property deteriorates. On the other hand, if the content of the OH groups is less than about 2%, the adsorption amount of the water-repelling agent is too small, and sufficient water-repelling effects can not be obtained. Accordingly, it is preferable that the content of the OH groups is in the range of about 2 to 80%.

EXAMPLE 5

A ceramic member for use in a laminated ceramic capacitor, having base electrodes formed thereon was dipped into the hydrolyzed water-repelling agent for 2 minutes similarly to Example 4. The liquid was removed, and the ceramic member was air-dried. Thereafter, the ceramic member was placed into an oven and heat-treated at 100 to 120° C. for 30 minutes. As a comparative example, a ceramic member to which the hydrolyzed water-repelling agent without heat treatment was adsorbed was prepared similarly to Example 4. Assuming that the water-repelling agent would be released, caused by handling in a mass production process, these ceramic members were barrel-treated at 60 rpm for 30 minutes by means of a 2 L plastic pot. Ni plating and Sn plating were sequentially carried out on the base electrodes to prepare laminated ceramic capacitors. Regarding the laminated ceramic capacitors, tests of intrusion of the plating into the electrodes and the solder-bonding property, and the damp-proof loading test were carried out. Table 5 shows the results.

TABLE 5

| | | | intrusion of plating into electrodes number of samples n = 100 | continuity of Ni plating number of sample n = 100 | solder-bonding property number of samples n = 200 | damp-proof loading test number of samples n = 200 |
|---|---|---|---|---|---|---|
| heat-treated | content of OH groups | 2% | 0/100 | 0/100 | 0/200 | 0/200 |
| | | 10% | 0/100 | 0/100 | 0/200 | 0/200 |
| | | 50% | 0/100 | 0/100 | 0/200 | 0/200 |
| | | 80% | 0/100 | 0/100 | 0/200 | 0/200 |
| | | 90% | 0/100 | 4/100 | 12/200 | 2/200 |
| air-dried only | content of OH groups | 2% | 0/100 | 0/100 | 0/200 | 3/200 |
| | | 10% | 0/100 | 0/100 | 0/200 | 2/200 |
| | | 50% | 0/100 | 0/100 | 0/200 | 1/200 |
| | | 80% | 0/100 | 0/100 | 0/200 | 1/200 |
| | | 90% | 0/100 | 0/100 | 0/200 | 2/200 |

As is apparent from Table 5, regarding the air-drying only, deterioration of the insulation resistance was shown by the damp-proof loading test. Probably, the reason for the deterioration lies in that the coats made form the water-repelling agent were peeled off, caused by the barrel-treatment. On the other hand, when the heat treatment was carried out, the water-repelling agent was condensation-polymerized and was covalently bonded to the base electrodes, so that the water-repelling agent was not peeled off by the barrel-treatment, and no deterioration of the insulation resistance was shown by the damp-proof loading test.

Various changes and modification can be made in the invention without departing from the spirit and scope thereof. The various embodiments set forth herein were intended to be illustrative only and were not intended to limit the invention.

What is claimed is:

1. A method of producing a ceramic electronic component including a ceramic member having end-faces and at least one external electrode on an end-face of the ceramic member, and at least one plating on the external electrode, comprising:
   forming a coating for preventing intrusion of a plating solution on the external electrode by performing a water-repelling treatment on the external electrode on the ceramic member by contacting a water-repelling agent therewith; and
   plating the external electrode,
   wherein the water-repelling agent comprises a functional group enhancing the adsorptivity of the water-repelling agent for the external electrode and a hydrophobic group.

2. A method of producing a ceramic electronic component according to claim 1, wherein
   said functional group enhancing the adsorptivity is at least one functional group selected from the group consisting of a hydroxyl group, an amino group, an alkoxy and a mercapto group, and
   said hydrophobic group is at least one member selected from the group consisting of an alkyl group, a vinyl group, a phenyl group and a perfluoro group.

3. A method of producing a ceramic electronic component according to claim 2, wherein said water-repelling agent is represented by the formula

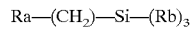

in which Ra represents the hydrophobic group, each individual Rb is a hydrolyzable functional group, at least one Rb is a hydrolyzed.

4. A method of producing a ceramic electronic component according to claim 3, wherein about 2% to 80% of the Rb groups comprise a hydroxyl group.

5. A method of producing a ceramic electronic component according to claim 4, wherein Ra is a perfluoro group and each individual Rb is a member selected from the group consisting of amino, hydrolyzed amino, alkyloxy and hydrolyzed alkoxy.

6. A method of producing a ceramic electronic component according to claim 5, wherein the ceramic member has a porous surface.

7. A method of producing a ceramic electronic component according to claim 6, further comprising:
   heating said ceramic member having said coating for preventing intrusion of said plating solution prior to said plating.

8. A method of producing a ceramic electronic component according to claim 7, wherein said ceramic member comprises a plurality of ceramic layers and at least one electrode disposed in the interior of said ceramic member.

9. A method of producing a ceramic electronic component according to claim 8, comprising forming said external electrode by coating an electrode paste on an end-face of the ceramic member and baking the paste.

10. A method of producing a ceramic electronic component according to claim 1, wherein a ceramic member has a porous surface.

11. A method of producing a ceramic electronic component according to claim 1, further comprising:
    heating said ceramic member having said coating for preventing intrusion of said plating solution prior to said plating.

12. A method of producing a ceramic electronic component according to claim 1, wherein said ceramic member comprises a plurality of ceramic layers and at least one electrode disposed in the interior of said ceramic member.

13. A method of producing a ceramic electronic component according to claim 1, comprising forming said external electrode by coating an electrode paste on an end-face of the ceramic member and baking the paste.

14. A ceramic electronic component produced by the method of producing a ceramic electronic component defined in claim 1.

15. A ceramic electronic component comprising a ceramic member having end-faces and at least one external electrode on an end-face of the ceramic member, at least one plating on the external electrode, and a water-repelling agent disposed between the external electrode and the plating,
wherein the water-repelling agent comprises a functional group enhancing the adsorptivity of the water-repelling agent for the external electrode and a hydrophobic group.

16. A ceramic electronic component according to claim 15, wherein said functional group enhancing the adsorptivity is at least one functional group selected from the group consisting of a hydroxyl group, an amino group, a mercapto group, and
said hydrophobic group is at least one group selected from the group consisting of an alkyl group, a vinyl group, a phenyl group and a perfluoro group.

17. A ceramic electronic component according to claim 16, wherein said water-repelling agent is represented by the formula

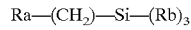

in which Ra represents the hydrophobic group, each individual Rb is a hydrolyzable functional group, and at least one Rb is a hydrolyzed.

18. A ceramic electronic component according to claim 17, wherein Ra is a perfluoro group and each individual Rb is a member selected from the group consisting of amino, hydrolyzed amino, alkyloxy and hydrolyzed alkoxy.

19. A ceramic electronic component according to claim 17, wherein said ceramic member comprises a plurality of ceramic layers and at least one electrode disposed in the interior of said ceramic member.

20. A ceramic electronic component according to claim 15, wherein said plating comprises a plurality of superposed plating layers.

* * * * *